United States Patent [19]

Ishiguro et al.

[11] Patent Number: 5,903,785
[45] Date of Patent: May 11, 1999

[54] CAMERA WITH DATE RECORDING DEVICE

[75] Inventors: Minoru Ishiguro; Junichi Iwamoto; Minoru Takahashi, all of Omiya, Japan

[73] Assignee: Fuji Photo Optical Co., Ltd., Saitama-ken, Japan

[21] Appl. No.: 08/971,468

[22] Filed: Nov. 17, 1997

Related U.S. Application Data

[63] Continuation of application No. 08/543,939, Oct. 17, 1995, abandoned.

[30] Foreign Application Priority Data

Oct. 17, 1994 [JP] Japan ................................. 6-250666
Oct. 17, 1994 [JP] Japan ................................. 6-250669

[51] Int. Cl.⁶ ..................................................... G03B 7/26
[52] U.S. Cl. ......................... 396/277; 396/279; 396/287; 396/297; 396/299; 396/317
[58] Field of Search ...................................... 396/277, 279, 396/280, 281, 297, 299, 310, 315, 317, 318

[56] References Cited

U.S. PATENT DOCUMENTS

| 4,958,174 | 9/1990 | Goto et al. | 354/106 |
| 5,099,262 | 3/1992 | Tanaka et al. | 396/312 |
| 5,465,133 | 11/1995 | Aoki et al. | 396/238 |
| 5,471,268 | 11/1995 | Jeong et al. | 396/317 |
| 5,526,079 | 6/1996 | Goto et al. | 354/106 |
| 5,579,066 | 11/1996 | Miyamato et al. | 396/279 |

Primary Examiner—Eddie C. Lee
Attorney, Agent, or Firm—Young & Thompson

[57] ABSTRACT

A camera equipped with a date recording device and a display for showing at least the time. Also included is a device to display the time on the film. The display also indicates battery power and flashes to indicate when the battery has been replaced.

4 Claims, 7 Drawing Sheets

CAMERA WITH DATE RECORDING DEVICE

This application is a continuation of application Ser. No. 08/543,939, filed Oct. 17, 1995, now abandoned.

BACKGROUND OF THE INVENTION

1. Field of the Invention

The resent invention relates to a camera with a date recording device for recording date and time on a film, and, more particularly, to a date recordable camera which is capable of operating in at least two modes.

2. Description of Related Art

Typically, various types of photographic cameras which have functions for recording date and/or time on a film are known. Such a date recordable camera typically incorporates therein a date recording device having a clock circuit, a liquid crystal display (LCD) device for displaying figures representative of date and/or time, a liquid crystal display (LCD) device serving as a pattern exposure mask for exposing a figure pattern of date and time to a film, and an illumination lamp. A transparent pattern display panel of the pattern exposure liquid crystal (LCD) device is disposed in contact with a surface of the film and illuminated from the back by the illumination lamp. While the LCD device displays thereon a series of figures representative of a date and/or a time counted by the clock circuit, the pattern exposure LCD device forms a transparent pattern of the series of figures through which light from the illumination lamp passes to expose the film, recording an image of the figure pattern on the film.

Date and time counted by the clock circuit and displayed on the LCD device is adjustable through a plurality of externally operated date switches including a display mode selection switch, a digit position selection switch, an adjusting switch and the like. In many instances, the display mode selection switch gives a selection among a date mode in which "year," "month" and "day" are displayed on the LCD device, a time mode in which "hour" "minute" and "second" are displayed on the LCD device, and the like. The term "digit position" used herein shall refer to one of positions of figures representative of "year," "month," "day," "hour," "minute" and "second".

Ordinarily, the camera has various other switches such as a flash exposure selection switch, an automatic focusing selection switch, a self-exposure selection switch and the like. As described above, the prior art cameras equipped with date recording devices have a number of switches which leads to an increased number of breakdowns and might be an obstacle to making such a camera lighter and smaller.

According to another aspect of the prior camera equipped with a date recording device, since the clock circuit includes a time memory which is in many instances comprised of a volatile random access memory (RAM), when power supply to the clock circuit is interrupted during battery replacement of batteries, the time memory loses its contents. In such a case, the date must be reset after the replacement of batteries. However, since the camera is automatically placed into an inoperative mode upon removal of batteries from the camera and removes the display of date on the LCD device, it is difficult to perceive whether or not date has been reset after the replacement of batteries.

SUMMARY OF THE INVENTION

It is an object of the present invention to provide a camera equipped with a date recording device which has a decreased number of switches and is made lighter and smaller.

It is another object of the present invention to provide a camera equipped with a date recording device which gives an indication to reset the date after replacement of batteries.

These objects of the present invention are achieved by providing a camera equipped with a date recording device which includes a clock circuit for counting a present time, a date/time display device for displaying selectively patterns including at least figures which represent at least the time counted by the clock circuit and is viewed from the outside of the camera, and a date recording device for photographically recording the time on a film loaded in the camera. The camera incorporates a display control means for monitoring electric power of a battery for actuating the date recording device in the camera and the date/time display device to display a specific one of the patterns thereon and flash on and off the same when detecting replacement of the batteries. The specific pattern may comprise a coded word including figures and letters indicating a message to reset the time displayed on the date/time display device.

The camera further comprises at least one function switch selectively having an operation mode setting function for setting a specific operation mode of the camera and a display mode setting function for selectively setting display modes of the date/time display device, a function changing switch for causing the function switch to select one of the operation mode setting function and the display mode setting function, and a display control means for displaying date or time on the date/time display device when the function changing switch causes the function switch to be operative with the operation mode setting function and flashing on and off at least one of figures of the pattern displayed on the date/time display device when the function changing switch causes the function switch to be operative with the display mode setting function.

With the camera, immediately after replacement of batteries and resetting the count of the clock circuit, the date/time display device flashes on and off at least one figure of a pattern displayed thereon, visually calling the camera user's attention to resetting the time of the clock circuit. Furthermore, since the date/time display device retains a pattern of figures representative of a time lightened continuously when the function switch is operative with the operation mode setting function and, however, flashes on and off the pattern of figures when operative with the display mode setting function, the camera easily identifies which function is operative.

Together, the camera is provided with a function switch operative with two different functions, making the number of switches half as compared to conventional cameras having a switch operative with a single function and making the camera lighter and smaller.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
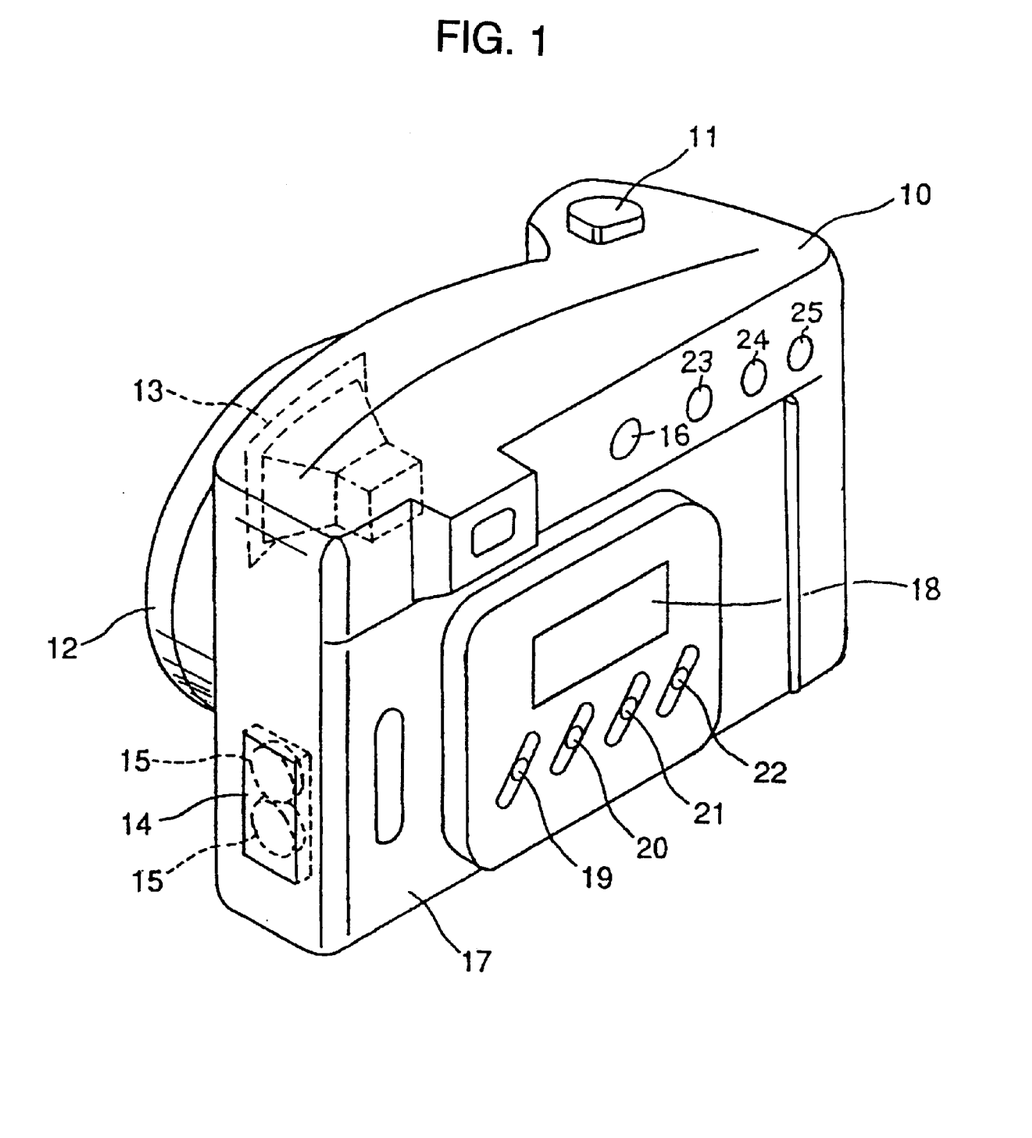
FIG. 1 is a perspective view of a camera equipped with a date recording device in accordance with a preferred embodiment of the present invention.

Referring to the drawings in detail, in particular to FIG. 1, a camera equipped with a date recording device according to a preferred embodiment of the present invention has a generally rectangular box-shaped camera housing 10 provided with a lens barrel 12 attached to the front wall and a shutter release button 11 placed on the top thereof. The lens barrel 12 is moved back and forth by an incorporated motor so as to focus on an object. Further, the camera housing 10 is provided with an electronic flash device 13 disposed at an upper corner. Within the camera housing 10 there are incorporated batteries 15, as a power source for the focusing mechanism of the lens barrel 12, firing the electronic flash 13, a film advancing mechanism including a motor and the like, received in a battery chamber 14 at one side of the camera housing 10.

The camera housing 10 is further provided with various operation selection switches 23–25 on the back as well as an electric power switch 16 at an upper center of the back. Upon a back lid 17 hinged to the back of the camera housing 10 there are provided a date/time display panel 18 and four function switches 19–22 arranged in a line below the date/time display panel 18. The switch 19, which is referred to as a function selection switch, selects or changes functions of the function switches 20–22 which are previously endowed. Each of the function switches 20–22, which are referred to as double function switches, has two functions, namely an operation mode setting function and a display mode setting function, which are selected by the function selection switch 19. This switching system makes the number of switches half as compared to conventional cameras having a number of switches, each having a single function. The date/time display panel 18 changes its display mode between a blinking mode and a continuous lighting mode according to selected functions of the double function switches 20–22. The display modes of the date/time display panel 18 allows an easy understanding of a selected functions of the double function switches 20–22.

Figure 2:
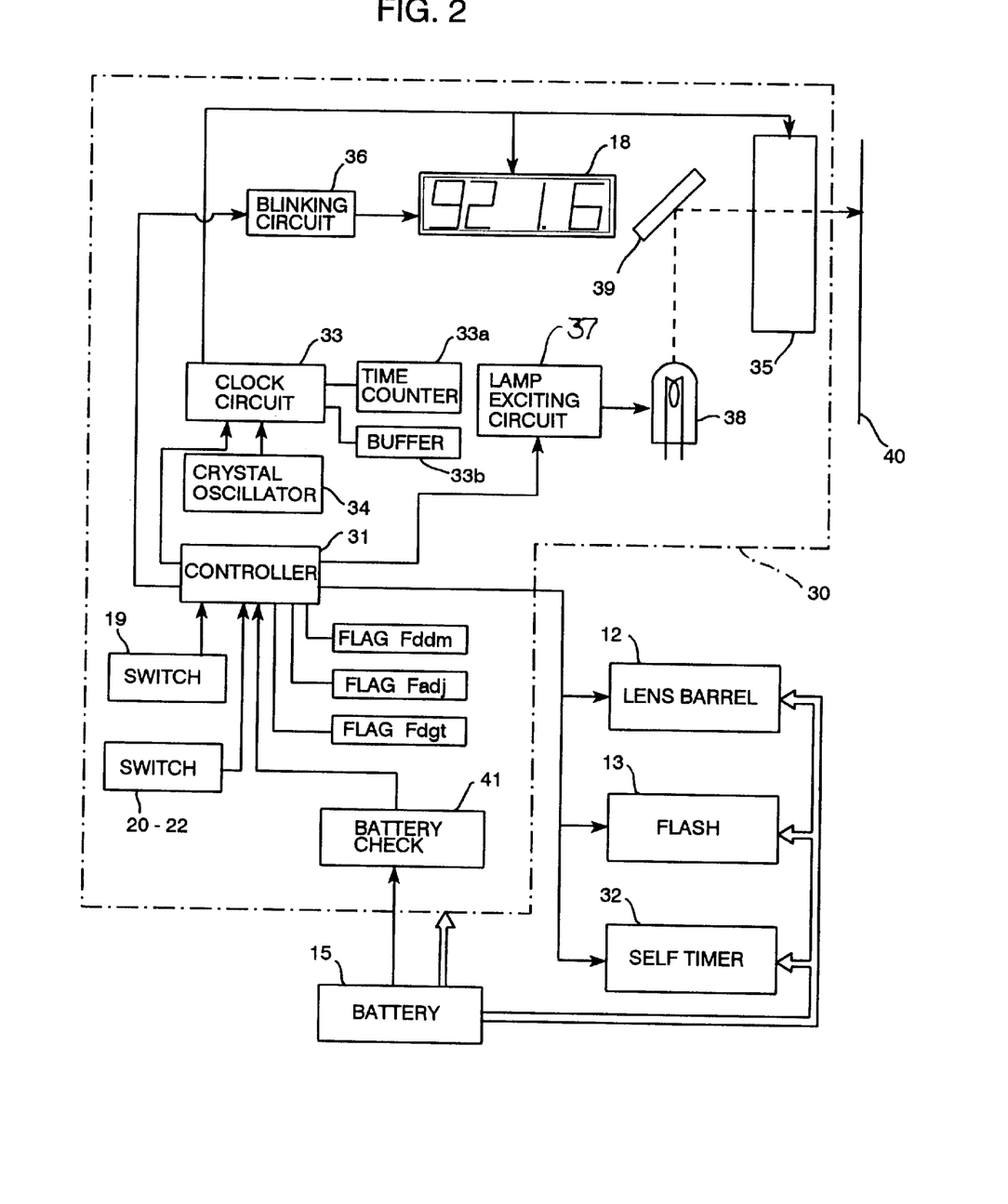
FIG. 2 is a block diagram showing a date unit.

In order for the double function switches to perform two different functions, the camera includes a date unit 30 as shown in FIG. 2. The date unit 30 includes a controller 31 for changing functions of the double function switches 20–22 according to a signal provided by the function selection switch 19. In this instance, when the function selection switch 19 selects for the double function switches 20–22 the operation mode setting function, these double function switches 20–22 are used to set various operation modes of the camera. For instance, the double function switch 20 sets a flash exposure mode for the electronic flash device 13; the double function switch 21 sets an automatic focusing mode for the focusing mechanism; and the double function switch 22 sets a self-exposure mode of a self-timer mechanism. On the other hand, when the function selection switch 19 selects for the double function switches 20–22 the display mode setting function, the double function switch 20 selects one among a date mode in which a date is displayed in the form of "year-month-day," a time mode in which time is displayed in the form of "hour-minute-second" and a display-off mode in which nothing is displayed; the double function switch 21 selects any one of figures representative of "year," "month," "day," "hour," "minute" and "second," which is to be adjusted; and the double function switch 22 adjusts the selected figure or resets it to 0 (zero).

The controller 31, which comprises mainly a microcomputer, includes various flags, namely a date display mode flag Fddm which indicates the three display modes (the date display mode, the time display mode and the off-display mode), a clock adjustment flag Fadj which indicates two clock modes, namely a time adjustment mode and a stand-by mode, and a digit position flag Fdgt which indicates specified digit positions for figure or figures which are to be flashed on and off.

The date unit 30 includes a clock circuit 33, which has a time counter 33a and a buffer 33b, and a crystal oscillator 34. The time counter 33a counts clock pulses generated by the crystal oscillator 34. A time counted by the time counter is stored in the buffer 33b once and then displayed on both date/time liquid crystal display (LCD) device 18 of the reflex type and date/time exposure liquid crystal display (LCD) device 35 of the transmission type. When the double function switches 20–22 select the time display mode, while the buffer 33b corrects the time, the time counter 33a continues to count clock pulses. When the buffer 33b fixes a time it is substituted for the time of the time counter 33a. The controller 31 controls a blinking circuit 36 and a lamp exciting circuit 37. The blinking circuit 36 flashes on and off one of figures displayed on the LCD device 18 which has a digit position indicated by the digit position flag Fdgt when the clock adjustment flag Fadj indicates the time adjustment mode. The lamp exciting circuit 37 turns on the lamp 38 which in turn emits light which is reflected by a mirror 39 and illuminates the time exposure LCD device 35. The exposure LCD device 35 displays transmissive figures which pass the light so as to form a light pattern of figures on the back of the film 40. As a result, the film 40 is exposed to the light pattern of figures and forms a latent image of the figures.

A battery check circuit 41 in the date unit 30 monitors and examines a residual voltage of the batteries and applies a voltage signal to the controller 31.

The operation of the camera depicted in FIGS. 1 and 2 is best understood by reviewing FIGS. 3–7, which are a flow chart illustrating a date unit control routine for the microcomputer of the controller 31. Programming a computer is a skill well understood in the art. The following description is written to enable a programmer having ordinary skill in the art to prepare an appropriate program for the microcomputer. The particular details of any such program would of course depend upon the architecture of the particular computer selected.

Figure 3:
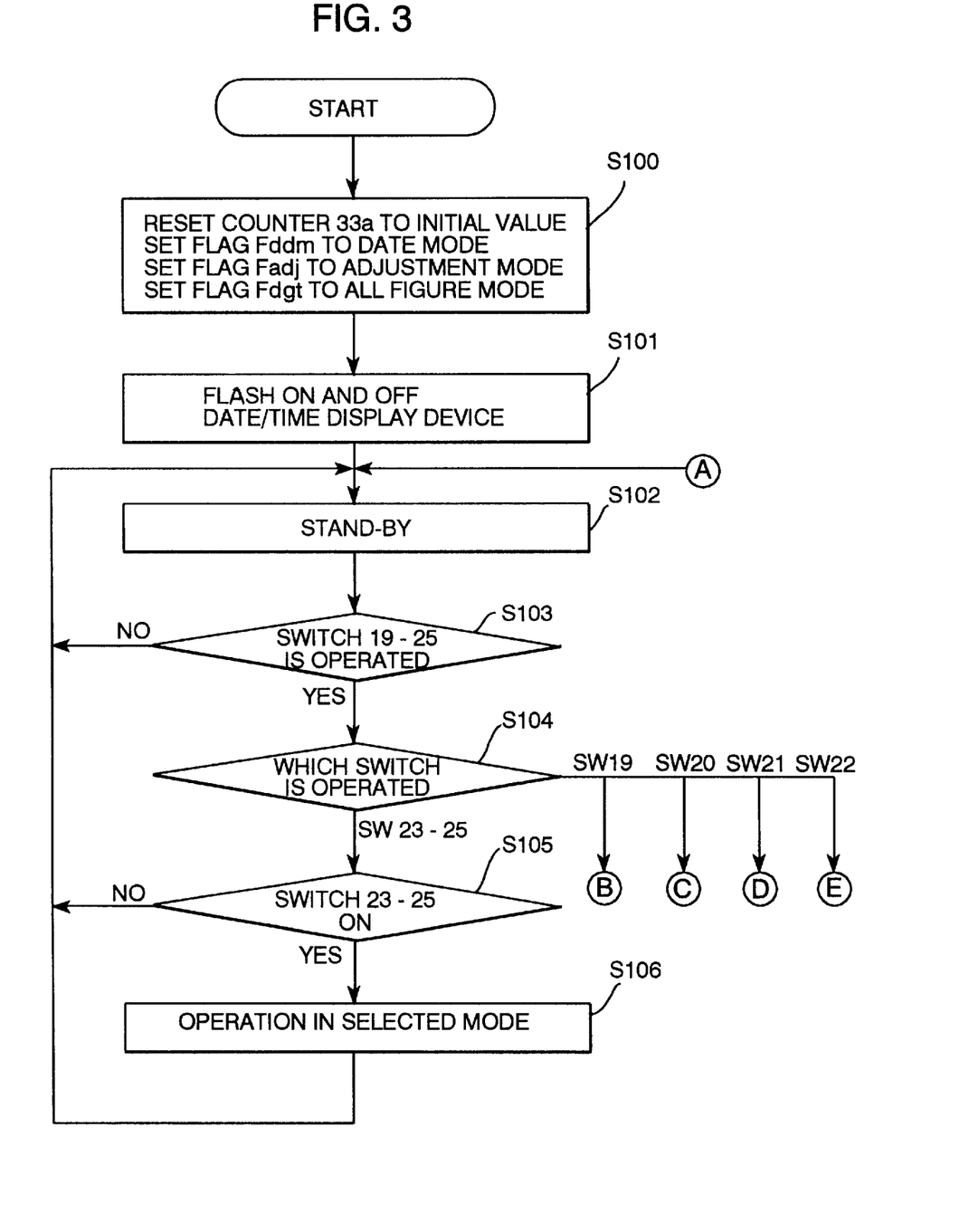
FIGS. 3–7 are a flow chart illustrating a date unit control routine.

The operation of the date unit 30 commences at a time the batteries 15 are loaded in the camera. The battery check circuit 41 continuously monitors the battery power and can detects the loading of batteries so as to provide for the controller 31 a start signal which indicates the loading of batteries. When the controller 31 receives a start signal, the date unit control sequence commences and proceeds to step S100 where initialization is made for the time counter circuit 33. Specifically, while the controller 31 causes the time counter 33a to reset its count to an initial count, it resets the flags Fddm, Fadj and Fdgt to the date display mode, the time adjustment mode and the all digit flash mode, respectively. Subsequently, the count value of the time counter 33a is sent to the date/time LCD device 18 through the buffer 33b so as to display a series of figures indicating a time on the date/time LCD device 18 at step S101. At this time, the blinking circuit 36 causes the date/time LCD device 18 to flash on and off all figures indicating the time until the clock adjustment flag Fadj and the digit position flag Fdgt F are changed. In this manner, immediately after loading the batteries 15, the date/time LCD device 18 flashes all figures displayed thereon, visually calling the camera user's attention to resetting the time. Because the date/time LCD device 18 is automatically brought into the adjustment mode after loading the batteries, resetting the time is immediate. The date/time LCD device 18 may indicates other types of information, for example a specific coded word such as "ERR-999" or a message in words urging resetting the time such as "reset a time !".

While the date/time LCD device 18 flashes on and off all figures displayed thereon, the controller 31 retains the clock adjustment flag Fadj set to the stand-by mode at step S102 until any one of the function changing switch 19 and the double function switches 20–22 are operated. At step S103, a decision is made as to whether or not any one of the switches 19–25 is operated. If in fact any one of the switches 19–25 is operated, another decision is subsequently made at step S104 as to which switch has been operated. When any one of the function switches 19–22 has been operated, the controller 31 performs controls according to functions selected by the function switches 19–22. On the other hand, if any one of the operation selection switches 23–25 has been operated, a decision is made at step S105 as to whether the switch or switches operated have been in the "ON" state. If the switch operated has been in the "ON" state, the controller 31 performs a specific camera operation selected by the operated switch. Thereafter, the date unit control brings the camera into the stand-by mode at step S102. If the switch operated has been in the "OFF" state at step S105, the date unit control sequence brings the camera directly into the stand-by mode at step S102.

Figure 4:
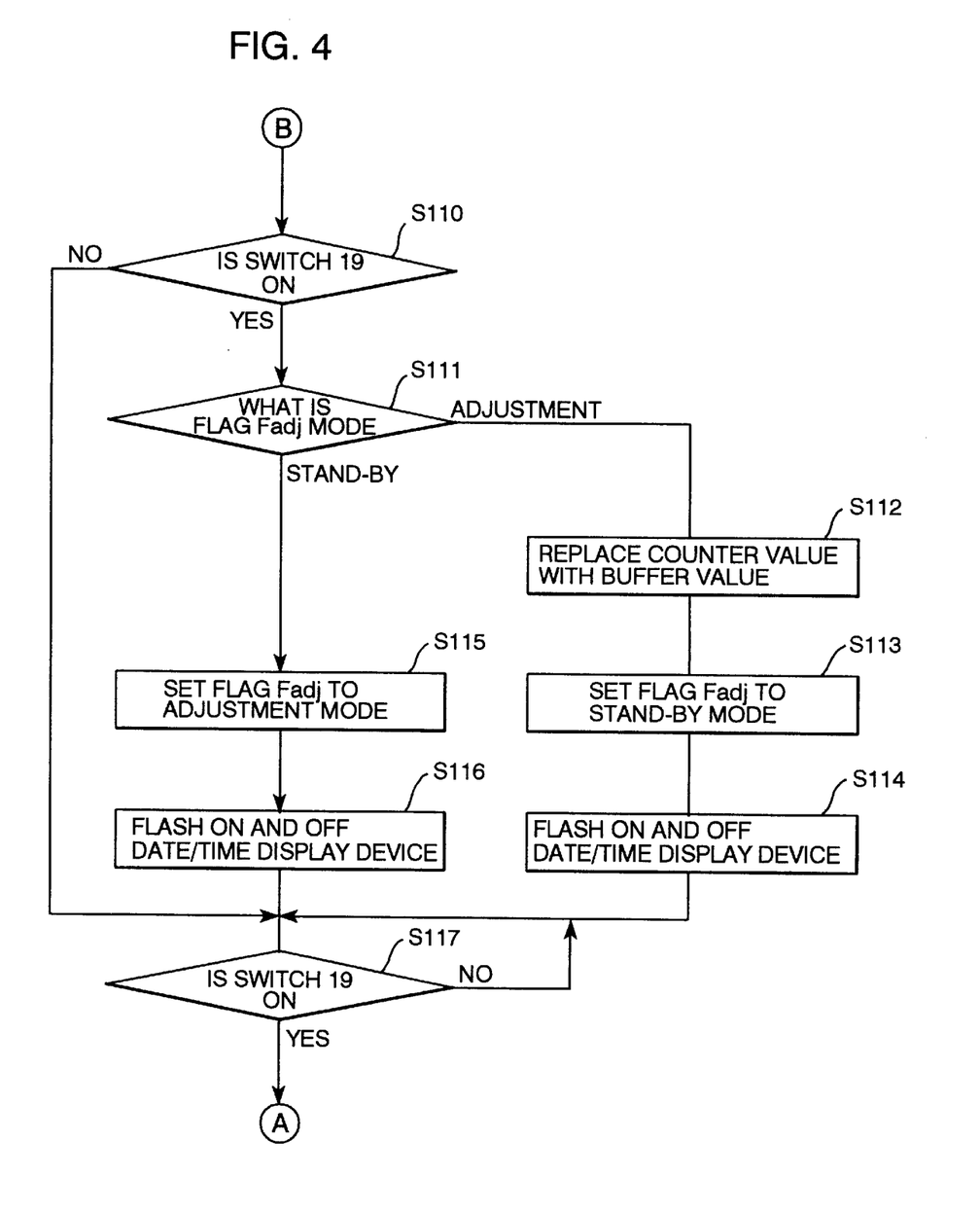

As shown in FIG. 4, when the function selection switch 19 is operated, a decision is made at step S110 as to whether the function selection switch 19 has been in the "ON" state. If the answer to the decision is "YES," another decision is made at step S111 as to whether the clock adjustment flag Fadj has been set to the adjustment mode. If so, the time counter 33a replaces its count with the value of the buffer 33b at step S112. After setting the clock adjustment flag Fadj to the stand-by mode at step S113, the date/time LCD device 18 flashes on and off its displayed figures at step S114. In this instance, the buffer 33b stores a calendar corrected through steps S153–S158 which will be described later and substitutes the calendar value for the count of the time counter 33b for setting the time.

If the result of the decision made at step Sill is "NO," this indicates that the clock adjustment flag Fadj has been set to the stand-by mode, then, after setting the clock adjustment flag Fadj to the adjustment mode at step S115, the date/time LCD device 18 flashes on and off its displayed figures at step S116.

After causing the date/time LCD device 18 to flash on and off its displayed figures at step S114 or S116, or when the result of the decision made at step S110 is "NO," a decision is made at step S117 as to whether the function selection switch 19 has been in the "OFF" state. If the function selection switch 19 is in the "OFF" state, that is, the result to the decision is "YES," the date unit control sequence brings the camera directly into the stand-by mode at step S102. This decision is repeated until the function selection switch 19 is turned to the "OFF" state.

Figure 5:
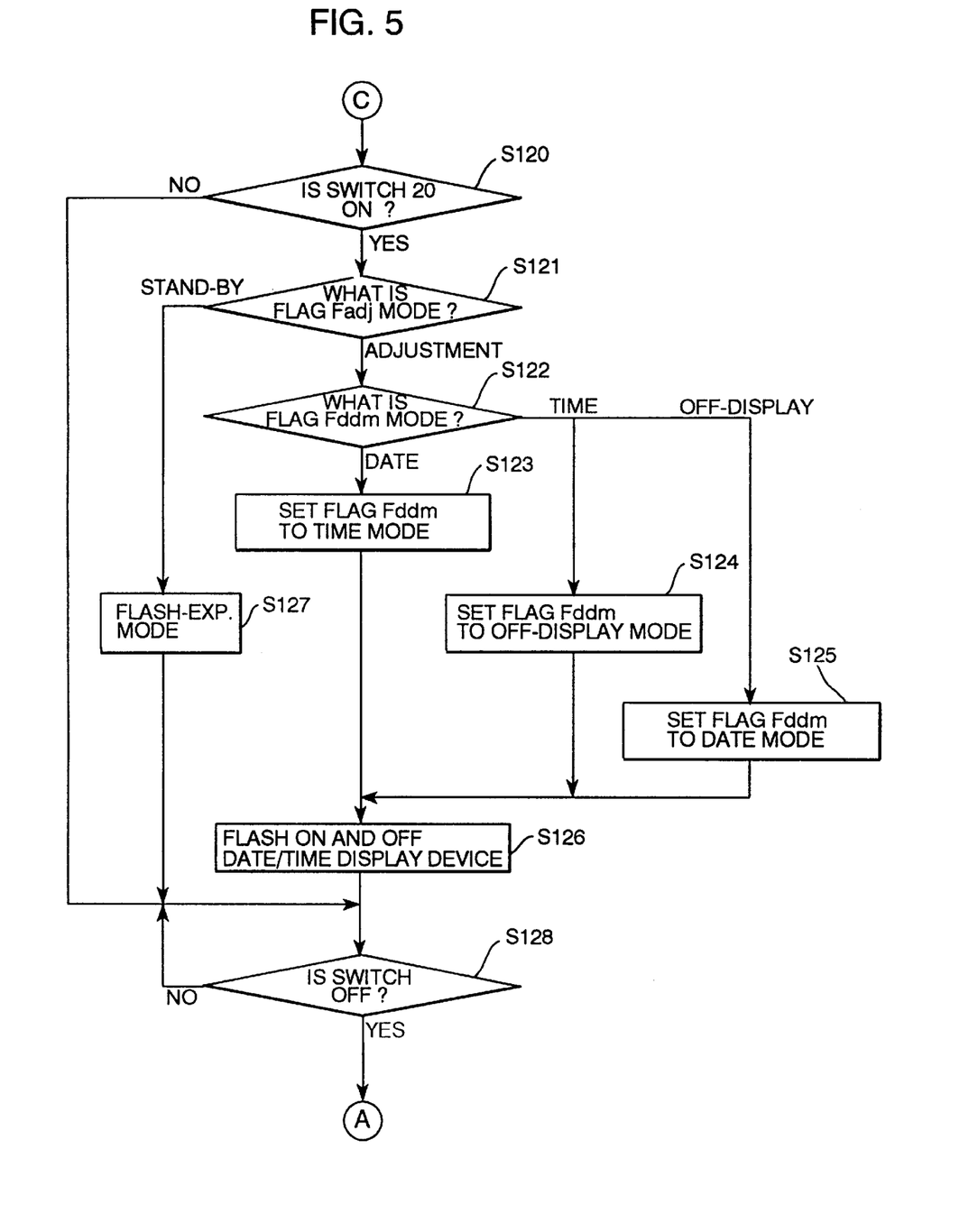

FIG. 5 shows a part of the date unit control sequence taking place when the double function switch 20 is operated. As part of the date unit control sequence, the double function switch 20 can select any one of the three display modes, i.e. the "year-month-day" display mode, the "day-hour-minute" display mode and the display-off mode when the function selection switch 19 selects for the double function switch 20 the display mode or select the flash exposure mode when the function selection switch 19 selects for the double function switch 20 the operation mode.

As shown in FIG. 5, following the decision made at step S104 in FIG. 3, a decision is made at step S120 as to whether the double function switch 20 has been in the "ON" state. If so, another decision is made at step S121 as to whether the clock adjustment flag Fadj has been set to the adjustment mode. If so, a further decision is made at step S122 as to which mode the data display mode flag Fddm indicates. If the mode indicated by the data display mode flag Fddm is the date in "year-month-day" display mode, after setting the display mode flag Fddm to the time display mode at step S123, the date/time LCD device 18 flashes on and off its displayed figures at step S126. If the mode indicated by the data display mode flag Fddm is the time in "hour-minute-second" display mode, after setting the display mode flag Fddm to the display-off mode at step S124, the date/time device LCD 18 flashes on and off its displayed figures at step S126. Further, if the mode indicated by the data display mode flag Fddm is the display-off mode, after setting the display mode flag Fddm to the date in "year-month-day" display mode at step S125, the date/time LCD device 18 flashes on and off its displayed figures at step S126.

On the other hand, If the answer to the decision is "NO," this indicates that the clock adjustment flag Fadj has been set to the stand-by mode, then, the double function switch 20 sets the flash exposure mode at step S127. After causing the date/time device LCD 18 to flash on and off its displayed figures at step S126, or when the flash exposure mode has been set at step S127, a decision is made at step S128 as to whether the double function switch 20 has been in the "OFF" state. If the double function switch 20 is in the "OFF" state, that is, the date unit control sequence brings the camera directly into the stand-by mode at step S102. This decision is repeated until the double function switch 20 is turned to the "OFF" state.

Figure 6:
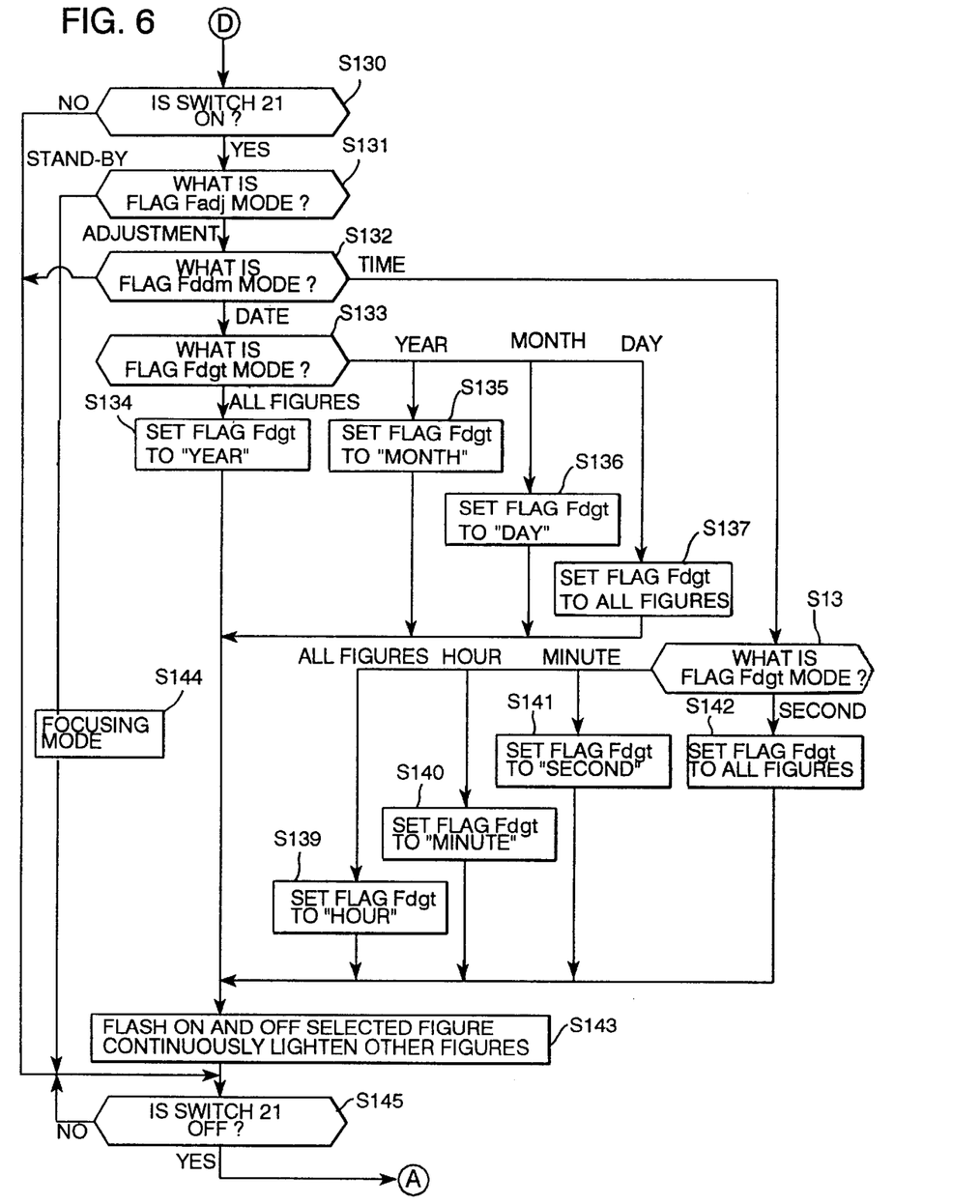

FIG. 6 shows a part of the date unit control sequence taking place when the double function switch 21 is operated. In the part of the date unit control sequence, the double function switch 21 can select any one of figures indicating "year," "month, "day," "times" in hour, minute or second, which is intended to be adjusted when the function selection switch 19 selects for the double function switch 21 the display mode setting function or select the automatic focusing mode when the function selection switch 19 selects for the double function switch 20 the operation mode setting function.

Following the decision made at step S104 in FIG. 3, a decision is made at step S130 as to whether the double function switch 21 has been in the "ON" state. If so, another decision is made at step S131 as to whether the clock adjustment flag Fadj has been set to the adjustment mode. If so, a decision is subsequently made at step S132 as to which mode the data display mode flag Fddm indicates. If the data display mode flag Fddm indicates the "year-month-day" display mode, a further decision is made at step S133 as to which digit position the digit position flag Fdgt indicates. When the digit position flag Fdgt indicates all digit figures, after setting the digit position flag Fdgt to a year digit at step S134, the date/time LCD device 18 flashes on and off all figures displayed thereon at step S143. When the digit position flag Fdgt indicates the year digit, after setting the digit position flag Fdgt to a month digit at step S135, the date/time LCD device 18 flashes on and off figures representative of "year" which is indicated by the digit position flag Fdgt and, however, leaves the remaining figures representative of "month" and "day" continuously lightened at step S143. When the digit position flag Fdgt indicates the month digit, after setting the digit position flag Fdgt to a day digit at step S136, the date/time LCD device 18 flashes on and off figures representative of "month" which is indicated by the digit position flag Fdgt and, however, leaves the remaining figures representative of "year" and "day" continuously lightened at step S143. Further, when the digit position flag Fdgt indicates the day digit, after setting the digit position flag Fdgt to the all digit at step S137, the date/time LCD device 18 flashes on and off figures representative of "day" which is indicated by the digit position flag Fdgt and, however, leaves the remaining figures representative of "year" and "month" continuously lightened at step S143.

If the result of the decision made at step S132 indicates the "day-hour-minute" display mode, another decision is made at step S138 as to which digit position the digit position flag Fdgt indicates. When the digit position flag Fdgt indicates all digit figures, after setting the digit position flag Fdgt to an hour digit at step S139, the date/time LCD device 18 flashes on and off all figures displayed thereon at step S143. When the digit position flag Fdgt indicates the hour digit, after setting the digit position flag Fdgt to a minute digit at step S140, the date/time LCD device 18 flashes on and off figures representative of "hour" which is indicated by the digit position flag Fdgt and, however, leaves the remaining figures representative of "minute" and "second" continuously lightened at step S143. When the digit position flag Fdgt indicates the minute digit, after setting the digit position flag Fdgt to a second digit at step S141, the date/time LCD device 18 flashes on and off figures representative of "minute" which is indicated by the digit position flag Fdgt and, however, leaves the remaining figures representative of "hour" and "second" continuously lightened at step S143. Further, when the digit position flag Fdgt indicates the second digit, after setting the digit position flag Fdgt to the all digit at step S142, the date/time LCD device 18 flashes on and off figures representative of "second" which is indicated by the digit position flag Fdgt and, however, leaves the remaining figures representative of "hour" and "minute" continuously lightened at step S143.

If the clock adjustment flag Fadj has been set to the off-display mode, then, the double function switch 21 sets the automatic focusing mode at step S144. After causing the date/time LCD device 18 to flash on and off all or a part of its displayed figures at step S143, when the automatic focusing mode has been set at step S144, when the result of the decision made at step S130 is "NO," this indicates that the double function switch has been in the "OFF" state, or when the answer to the decision made at step S131 is "NO," this indicates that the clock adjustment flag Fadj has been set to the stand-by mode, a decision is made at step S145 as to whether the double function switch 21 has been in the "OFF" state. If the double function switch 21 is in the "OFF" state, the date unit control sequence brings the camera directly into the stand-by mode at step S102. This decision is repeated until the double function switch 21 is turned to the "OFF" state.

Figure 7:
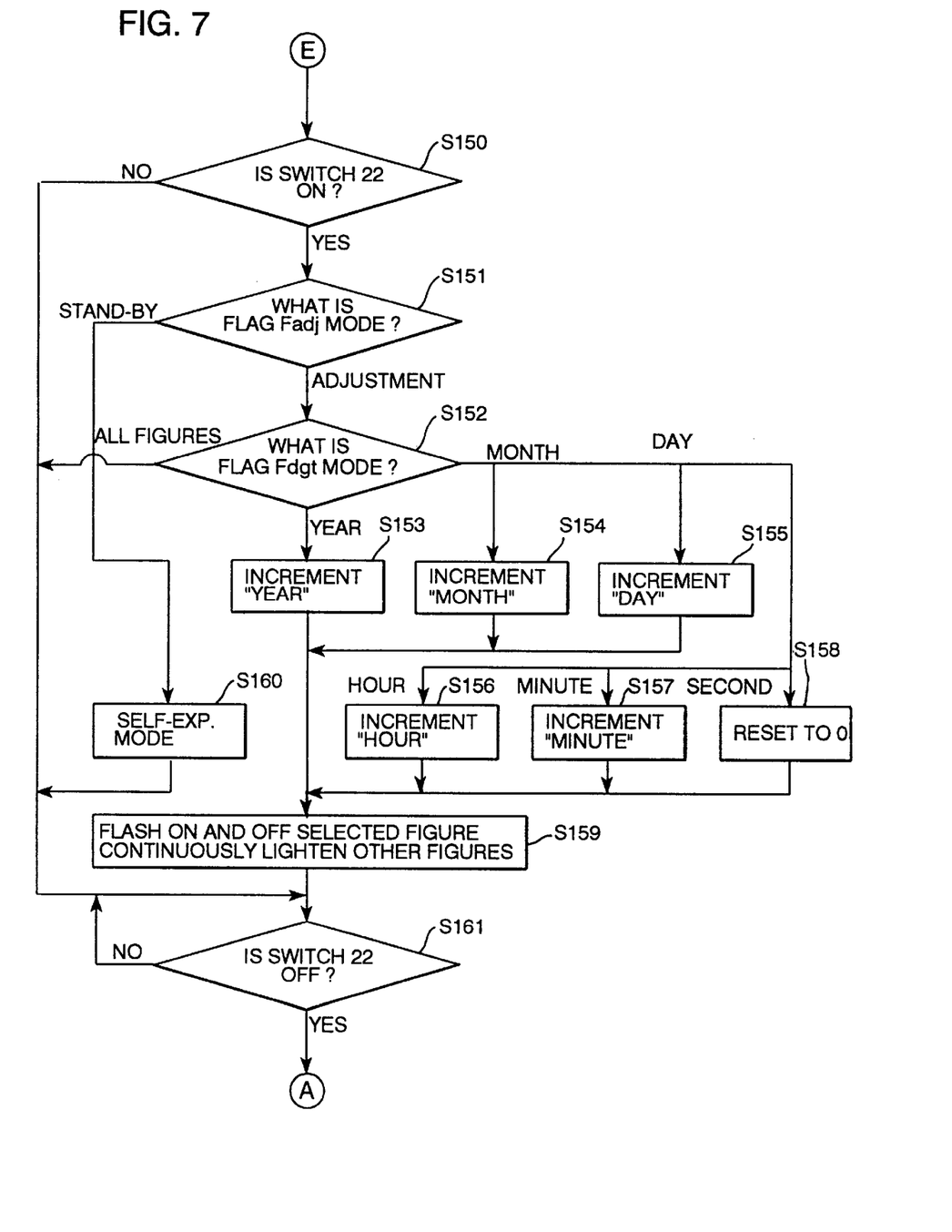

FIG. 7 shows a part of the date unit control sequence taking place when the double function switch 22 is operated. In the part of the date unit control sequence, the double function switch 22 can adjust any one of figures indicating "year," "month, "day," "times" in hour, minute or second, which is flashing on and off when the function selection switch 19 selects for the double function switch 22 the display mode setting function or select the self-exposure mode when the function selection switch 19 selects for the double function switch 20 the operation mode setting function.

Subsequent to the decision made at step S104 in FIG. 3, a decision is made at step S150 as to whether the double function switch 22 has been in the "ON" state. If so, another decision is made at step S151 as to whether the clock adjustment flag Fadj has been set to the adjustment mode. If so, a further decision is subsequently made at step S152 as to which digit position the digit position flag indicates. When the digit position flag Fdgt indicates the "year" digit, after incrementally changing the calendar value of "year" at step S153, the date/time LCD device 18 flashes on and off figures representative of "year" which is indicated by the digit position flag Fdgt and, however, leaves the remaining figures continuously lightened at step S159. When the digit position flag Fdgt indicates the month digit, after incrementally changing the calendar value of "month" at step S154, the date/time LCD device 18 flashes on and off figures representative of "month" which is indicated by the digit position flag Fdgt and, however, leaves the remaining figures continuously lightened at step S159. When the digit position flag Fdgt indicates the day digit, after incrementally changing the calendar value of "day" at step S155, the date/time device LCD 18 flashes on and off figures representative of "day" which is indicated by the digit position flag Fdgt and, however, leaves the remaining figures continuously lightened at step S159. When the digit position flag Fdgt indicates the digit of "time" in hour, after incrementally changing the calendar value of "hour" at step S156, the date/time LCD device 18 flashes on and off figures representative of "time in hour" which is indicated by the digit position flag Fdgt and, however, leaves the remaining figures continuously lightened at step S159. When the digit position flag Fdgt indicates the digit of "time in minute," after incrementally changing the calendar value of "month" at step S157, the date/time LCD device 18 flashes on and off figures representative of "time in hour" which is indicated by the digit position flag Fdgt and, however, leaves the remaining figures continuously lightened at step S159. Further, when the digit position flag Fdgt indicates the digit of "time in seconds," after resetting the calendar value of second to 0 (zero) at step S158, the date/time LCD device 18 flashes on and off figures representative of "time in seconds" which is indicated by the digit position flag Fdgt and, however, leaves the remaining figures continuously lightened at step S159.

When the answer to the decision made at step S151 is "NO," this indicates that the clock adjustment flag Fadj has been set to the stand-by mode, then, the double function switch 20 sets the self-exposure mode at step Sl60.

After causing the date/time LCD device 18 to flash on and off its displayed figures at step S159, when the self-exposure mode has been set at step S160, when the result of the decision made at step S150 is "NO," this indicates that the double function switch 22 has been in the "OFF" state, or when the result of the decision made at step S152 indicates all digits, a decision is made at step S161 as to whether the double function switch 22 has been in the "OFF" state. If the double function switch 22 is in the "OFF" state, that is, the answer to the decision is "YES," the date unit control sequence brings the camera directly into the stand-by mode at step S102. This decision is repeated until the double function switch 22 is turned to the "OFF" state.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A camera equipped with a time/date unit comprising:
   a controller, said controller controlling the operation of said time/date unit;

a battery;

a battery check device, said battery check device providing a signal to said controller indicating the condition of said battery;

a crystal oscillator, said crystal oscillator generating periodic pulses;

a clock circuit, comprising a time counter and a buffer, said clock circuit receiving as an input said periodic pulses;

an LCD display device disposed upon the outside of said camera, said display device comprising a plurality of individually controllable LCD elements, said LCD elements being capable of forming alphanumeric symbols;

a lamp;

a lamp exciting circuit, said lamp exciting circuit being controlled by said controller to cause said lamp to illuminate upon the taking of an exposure with said camera;

an LCD exposure device, said exposure device forming a character representation of at least one of time information and date information, said exposure device being disposed adjacent to photographic film in said camera, said exposure device causing said character representation to be exposed upon said photographic film when illuminated by said lamp;

a blinking circuit controlled by said controller, said blinking circuit being capable of causing the blinking of at least one of said elements of said LCD display device upon the replacement of said battery as detected by said battery check device to provide a visual indication of a need to reset time; and a plurality of switches disposed upon the outside of said camera, said switches being capable of altering the information displayed by said LCD exposure device and said LCD display device, wherein, upon the battery check device determining that the battery has been replaced and while the data displayed by the LCD display device has not yet been set, the controller automatically enters a data entry mode, allowing a user to set the data, the data entry mode being indicated by blinking of all of the LCD elements of the LCD display device, the LCD display device being structured and arranged to be switchable, under control of the controller, sequentially between an initial state in which date information is displayed to a state in which time information is displayed to a state in which no information is displayed and back to the initial state, the LCD display being further structured and arranged to be switched from a current one of the states to a next sequential one of the states with each closing of a first of the plurality of switches under control of the controller, the LCD display device being divided into subsets of the LCD elements which represent, respectively, year, month, and day information while the LCD display device is in the state in which date information is displayed and hour, minute, and second information while the LCD display device is in the state in which time information is displayed, the camera being structured and arranged so that each closing of a second of the plurality of switches sequentially selects one of the subsets, a selected one of the subsets of the LCD elements being made to blink while a remainder of the subsets are constantly displayed, the selected subset being set to display one of an incremented value and "00" by closing of a third of the plurality of switches under control of the controller.

2. The camera of claim 1, wherein under a condition in which the subset of the LCD elements representing seconds is selected while the LCD display device is in the state in which time information is displayed, the camera is structured and arranged so that the selected subset is reset to display "00" when the third of the plurality of switches is closed, and wherein the camera is structured and arranged so that any other of the subsets, when selected, is caused to represent a value which represents an increase by one from a current value under a condition in which the third of the plurality of switches is closed.

3. A camera equipped with a time/date unit comprising:

a controller, said controller controlling the operation of said time/date unit;

a battery;

a battery check device, said battery check device providing a signal to said controller indicating the condition of said battery;

a crystal oscillator, said crystal oscillator generating periodic pulses;

a clock circuit, comprising a time counter and a buffer, said clock circuit receiving as an input said periodic pulses;

an LCD display device disposed upon the outside of said camera, said display device comprising a plurality of individually controllable LCD elements, said LCD elements being capable of forming alphanumeric symbols;

a lamp;

a lamp exciting circuit, said lamp exciting circuit being controlled by said controller to cause said lamp to illuminate upon the taking of an exposure with said camera;

an LCD exposure device, said exposure device forming a character representation of at least one of time information and date information, said exposure device being disposed adjacent to photographic film in said camera, said exposure device causing said character representation to be exposed upon said photographic film when illuminated by said lamp;

a blinking circuit controlled by said controller, said blinking circuit being capable of causing the blinking of at least one of said elements of said LCD display device upon the replacement of said battery as detected by said battery check device to provide a visual indication of a need to reset time; and a plurality of switches disposed upon the outside of said camera, said switches being capable of altering the information displayed by said LCD exposure device and said LCD display device, wherein, upon the battery check device determining that the battery has been replaced and while the data displayed by the LCD display device has not yet been set, the controller automatically enters a data entry mode, allowing a user to set the data, the data entry mode being indicated by blinking of all of the LCD elements of the LCD display device, the LCD display device being structured and arranged to be switchable, under control of the controller, sequentially between an initial state in which an error message is displayed to a state in which date information is displayed to a state in which time information is displayed to a state in which no information is displayed and back to the date-display state, the LCD display being further structured and arranged to be switched from a current one of the states to a next sequential one of the states with each closing of a first of the plurality of switches under control of the controller, the LCD display device being divided into subsets of the LCD elements which represent, respectively, year, month, and day information while the LCD display device is in the state in which date information is displayed and hour, minute, and second information while the LCD display device is in the state in which time information is displayed, the camera being structured and arranged so that each closing of a second of the plurality of switches sequentially selects one of the subsets, a selected one of the subsets of the LCD elements being made to blink while a remainder of the subsets are constantly displayed, the selected subset being set to display one of an incremented value and "00" by closing of a third of the plurality of switches under control of the controller.

4. The camera of claim 3, wherein under a condition in which the subset of the LCD elements representing seconds is selected while the LCD display device is in the state in which time information is displayed, the camera is structured and arranged so that the selected subset is reset to display "00" when the third of the plurality of switches is closed, and wherein the camera is structured and arranged so that any other of the subsets, when selected, is caused to represent a value which represents an increase by one from a current value under a condition in which the third of the plurality of switches is closed.

\* \* \* \* \*